(12) United States Patent
Sharma et al.

(10) Patent No.: US 7,612,942 B2
(45) Date of Patent: Nov. 3, 2009

(54) OPTICAL DIFFUSER HAVING FRIT BASED COATING WITH INORGANIC LIGHT DIFFUSING PIGMENTS WITH VARIABLE PARTICLE SIZE THEREIN

(75) Inventors: Pramod K. Sharma, Ann Arbor, MI (US); Thomas J. Taylor, Northville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 219 days.

(21) Appl. No.: 11/324,756

(22) Filed: Jan. 4, 2006

(65) Prior Publication Data
US 2007/0153389 A1    Jul. 5, 2007

(51) Int. Cl.
*G02B 5/02* (2006.01)
*G02B 13/20* (2006.01)
(52) U.S. Cl. ...................................... 359/599; 359/361
(58) Field of Classification Search ............... 359/599, 359/361
See application file for complete search history.

(56) References Cited

U.S. PATENT DOCUMENTS

| | | | |
|---|---|---|---|
| 2,726,965 A | 12/1955 | Cressman et al. | |
| 3,148,300 A * | 9/1964 | Graff | 313/112 |
| 3,459,574 A * | 8/1969 | Kolb et al. | 106/443 |
| 3,531,677 A | 9/1970 | Loughridge | |
| 4,353,991 A | 10/1982 | Van Ness et al. | |
| 4,381,333 A | 4/1983 | Stewart et al. | |
| 4,390,636 A | 6/1983 | Votava | |
| 4,441,046 A | 4/1984 | James | |
| 5,196,088 A | 3/1993 | Soda | |
| 5,246,540 A | 9/1993 | Soda | |
| 5,306,674 A | 4/1994 | Ruderer et al. | |
| 5,332,618 A | 7/1994 | Austin | |
| 5,371,138 A | 12/1994 | Schaefer et al. | |
| 5,725,919 A | 3/1998 | Roberts et al. | |
| 5,725,957 A | 3/1998 | Varaprasad et al. | |
| 5,949,506 A | 9/1999 | Jones et al. | |
| 6,040,372 A | 3/2000 | Watanabe et al. | |
| 6,093,749 A | 7/2000 | Watanabe et al. | |
| 6,147,733 A * | 11/2000 | Miyamoto et al. | 349/112 |
| 6,149,888 A | 11/2000 | Ota et al. | |
| 6,164,785 A | 12/2000 | Mackawa | |

(Continued)

FOREIGN PATENT DOCUMENTS

DE  20 2006 002 057  4/2006
WO  WO 02/37568  5/2002

OTHER PUBLICATIONS

International Search Report dated May 31, 2007.

(Continued)

*Primary Examiner*—Joshua L Pritchett
(74) *Attorney, Agent, or Firm*—Nixon & Vanderhye P.C.

(57) ABSTRACT

A diffuser is provided that includes a glass substrate with a diffusing coating thereon. The diffusing coating may include one or more layers. In certain example embodiments, the diffusing coating comprises inorganic pigments therein for light diffusing purposes, and the inorganic pigments are sized so as to permit a diffuser having a combination of high visible transmission and good diffusion qualities to be realized. In certain example embodiments, the diffusing coating may be of or include a frit with the inorganic pigments therein.

22 Claims, 9 Drawing Sheets

U.S. PATENT DOCUMENTS

| | | |
|---|---|---|
| 6,180,224 B1 | 1/2001 | Shouji et al. |
| 6,376,066 B1 | 4/2002 | Kanzaki et al. |
| 6,384,526 B1 | 5/2002 | Peters |
| 6,521,677 B2 | 2/2003 | Yashiro et al. |
| 6,573,961 B2 | 6/2003 | Jiang et al. |
| 6,633,722 B1 | 10/2003 | Kohara et al. |
| 6,649,212 B2 | 11/2003 | Payne et al. |
| 6,686,047 B2 | 2/2004 | Yamaguchi et al. |
| 6,723,423 B1 | 4/2004 | Kaneko et al. |
| 6,831,027 B2 | 12/2004 | Gazo |
| 6,896,934 B2 | 5/2005 | Aronica et al. |
| 6,924,037 B1 | 8/2005 | Joret et al. |
| 6,934,080 B2 | 8/2005 | Saccomanno et al. |
| 6,940,665 B2 | 9/2005 | Cowan et al. |
| 6,942,906 B2 | 9/2005 | Sakata et al. |
| 6,943,342 B2 | 9/2005 | Bechtel et al. |
| 6,952,507 B2 | 10/2005 | Johnson et al. |
| 6,963,380 B1 | 11/2005 | Kwon et al. |
| 6,963,445 B2 | 11/2005 | Hoover et al. |
| 6,963,688 B2 | 11/2005 | Nath |
| 2003/0146680 A1 | 8/2003 | Wei |
| 2003/0156238 A1 | 8/2003 | Hiraishi et al. |
| 2003/0165675 A1 | 9/2003 | Marzolin et al. |
| 2003/0214812 A1 | 11/2003 | Bourdelais et al. |
| 2004/0228141 A1 | 11/2004 | Hay et al. |
| 2005/0105186 A1 | 5/2005 | Kaminsky et al. |
| 2005/0189524 A1 | 9/2005 | Weng et al. |
| 2006/0176429 A1 | 8/2006 | Watchi et al. |
| 2007/0064446 A1 | 3/2007 | Sharma et al. |
| 2007/0153389 A1 | 7/2007 | Sharma et al. |

OTHER PUBLICATIONS

U.S. Appl. No. 11/229,837, filed Sep. 20, 2005.
U.S. Appl. No. 11/314,735, filed Dec. 22, 2005.
U.S. Appl. No. 11/324,758, filed Jan. 4, 2006.
International Search Report dated Feb. 13, 2008.

* cited by examiner

| Example | Inorganic pigments | Particle size | Amount of pigments % by Wt. | Frit 20-8099 % by Wt. | Mesh |
|---|---|---|---|---|---|
| Example #1 | $Al_2O_3$ | <10µm | 5% | 95% | 140 |
| Example #2 | $Al_2O_3$ | 0.9-2.2 µm | 5% | 95% | 140 |
| Example #3 | $Al_2O_3$ | 0.35-0.49 µm | 5% | 95% | 140 |
| Example #4 | $SiO_2$ | 10 µm | 0.5% | 99.5 | 140 |
| Example #5 | $SiO_2$ | 4.5 µm | 0.5% | 99.5 | 140 |
| Example #6 | $TiO_2$ | 10 µm | 0.25% | 99.7 | 140 |
| Example #7 | $TiO_2$ | 0.5 µm | 12.8 | 84.9% with 2.3%Medium 1597 | 380 |
| Example #8 | $TiO_2$ | 0.2 µm | 0.25% | 99.7 | 140 |
| Example #9 | ZnO | 1 µm | 5% | 95% | 140 |
| Example #10 | ZnO | 0.06 µm | 5% | 95% | 140 |

Fig. 3

| Examples | F(Q) | Thickness | Tvis |
|---|---|---|---|
| Example #1 | 0.053 | 2.6 µm | 42.8% |
| Example #2 | 0.077 | 3.4 µm | 31.4% |
| Example #3 | 0.102 | 3.9 µm | 37.3% |
| Example #4 | 0.021 | 2.8 µm | 61% |
| Example #5 | 0.010 | 2.5 µm | 61.5% |
| Example #6 | 0.086 | 3.1 µm | 57% |
| Example #7 | 0.130 | 3.2 µm | 58% |
| Example #8 | 0.010 | 3.9 µm | 49.5% |
| Example #9 | 0.004 | 1.6 µm | 64 % |
| Example #10 | 0.290 | 2.2 µm | 63.2% |
| Commercial diffuser | 0.104 | 7 µm | 56% |

OPTICAL DIFFUSER HAVING FRIT BASED COATING WITH INORGANIC LIGHT DIFFUSING PIGMENTS WITH VARIABLE PARTICLE SIZE THEREIN

The technology presented herein relates to a diffuser for use in optical devices. In certain example embodiments, the diffuser includes a diffusing coating provided on a glass substrate, wherein the coating comprises inorganic pigments therein for light diffusing purposes. In certain example embodiments, the inorganic pigments are sized so as to permit a diffuser having a combination of high visible transmission and good diffusion qualities to be realized.

BACKGROUND AND SUMMARY OF THE EXAMPLE EMBODIMENTS

Diffusers are known in the art. Diffusers are for widely scattering and/or spreading light, and are used in many different optical application including but not limited to wrist watches, projection systems, displays (e.g., LCDs), computer screens, surgical equipment, optical communication systems, light sensors, fiber optic systems, microscope illumination systems, light guides, and so forth.

Many optical devices such as projection systems, computer screens, surgical equipment, LCDs, communication systems, microscope illumination systems and/or the like use bright light source(s) for illumination or the like. Diffusion of light is often desired in such illumination systems. The light exiting the diffuser in such a system is desired to be highly diffused as it passes through the media or toward the desired structure, as otherwise the illumination of the structure will not be sufficiently uniform. Plastic diffusers have been used in certain applications. However, the use of plastic diffuser sheets is difficult due to the high temperatures which may be experienced within the illumination unit.

Thus, it will be appreciated that there exists a need in the art for diffusers that are not based on plastic.

In certain example embodiments, a diffuser is provided that includes a glass substrate with a diffusing coating thereon. The diffusing coating may include one or more layers. In certain example embodiments, the diffusing coating comprises inorganic pigments therein for light diffusing purposes, and the inorganic pigments are sized so as to permit a diffuser having a combination of high visible transmission and good diffusion qualities to be realized. In certain example embodiments, the diffusing coating may be of or include a frit (e.g., glass frit) with the inorganic pigments therein.

The diffusing properties of the diffuser depend on the scattering of light by particles in the coating. Hence, there is a need of an understanding of the effect of particle size of the inorganic pigments in the coating on diffusing performance, while still permitting an adequate amount of transparency in the visible region of the diffuser to be realized. For example and without limitation, the inorganic pigments of the diffusing coating may be of or include one or more of alumina, zinc oxide, cerium dioxide, titanium dioxide, silicon dioxide, and the like, and can be used as scattering centers for the diffuser.

In certain example embodiments, the diffuser may also include an optional UV (ultraviolet) coating(s) that blocks significant amounts of UV radiation thereby reducing the amount of UV radiation which can makes its way through the diffuser. The UV coating may be provided separate from or as part of the light diffusing coating.

Diffusers according to certain example embodiments may be used in an illumination system in any suitable optical application, including but not limited to applications such as wrist watches, projection systems, display backlights, computer screens, surgical equipment, optical communication systems, light sensors, fiber optic systems, microscope illumination systems, and light guides.

In certain example embodiments, there is provided an illumination system comprising: a light source for emitting light, the light emitted from the light source including at least visible light and ultraviolet (UV) radiation; a diffuser positioned so as to receive light from the light source, the diffuser diffusing visible light received from the light source; wherein the diffuser comprises a glass substrate that supports a light diffusing coating, the light diffusing coating comprising inorganic pigment particles mixed with a frit matrix; and wherein the diffuser has a diffusing property F(Q) of greater than 0.100 (more preferably greater than 0.102, even more preferably greater than 0.110, and sometimes greater than 0.125, 0.200 or 0.250) and a visible transmission of at least 57% (more preferably at least 58%, 60%, or 61%), where F(Q) is defined by: $F(Q)=1/[4(\{\theta max-\theta min\}/W)^2+1]$ where W is a half width at a half maximum value point of a illumination vs. diffusing angle plot, $\theta max$ is a maximum value of the illumination vs. diffusing angle plot, and $\theta min$ is a minimum of at least one of the tails of the illumination vs. diffusing angle plot.

In other example embodiments, there is provided an illumination system comprising: a light source for emitting light; a diffuser positioned so as to receive light from the light source, the diffuser diffusing visible light received from the light source; and wherein the diffuser comprises a glass substrate that supports a light diffusing coating, the light diffusing coating comprising inorganic pigment particles mixed with frit.

DETAILED DESCRIPTION OF EXAMPLE EMBODIMENTS

Referring now more particularly to the figures where like reference numerals indicate like parts throughout the several views. This invention relates to a diffuser for use in illumination systems for optical devices/systems.

Figure 1:
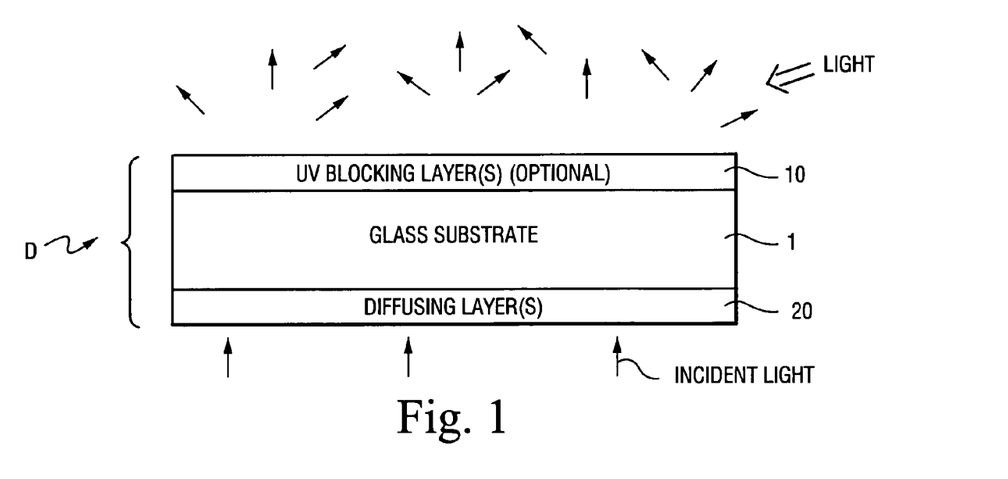
FIG. 1 is a cross sectional view of a diffuser according to an example embodiment.

FIG. 1 is cross sectional view of a diffuser D according to an example embodiment. The diffuser D of the FIG. 1 embodiment includes a glass substrate 1, an optional UV blocking coating 10, and a diffusing coating 20. The diffusing coating 20 may include one or more layers. In certain example embodiments, the diffusing coating 20 may be based on frit and include inorganic light scattering pigment particles mixed in with the frit. The glass substrate 1 may be a soda-lime-silica based glass substrate according to certain example embodiments, and may or may not be heat treated (e.g., thermally tempered). The glass of substrate 1 is more durable and can withstand high temperature applications, and does not degrade upon UV exposure, compared to plastic.

Still referring to FIG. 1, in certain example embodiments, the optional UV blocking coating 10 functions to block significant amounts of UV radiation that was present in the incident light from the light source(s) of the illumination system, whereas the diffusing coating 20 causes the incident light to substantially spread out or scatter as it moves through the glass substrate 1. Each of the UV blocking coating 10 and the diffusing coating 20 do not block significant amounts of visible rays (e.g., no more than about 10% each, more preferably no more than about 5% each), so that efficiency of transmission of visible radiation is retained and/or maintained by the diffuser. In the FIG. 1 embodiment, the UV coating 10 and the diffusing coating 20 are on opposite major sides of the glass substrate 1; however, this invention is not so limited. In certain other example embodiments, the diffusing coating 20 may be located on the front major surface of the glass substrate 1 so that the glass substrate 1 is between the diffusing coating and the light source. In other example embodiments, the diffusing coating 20 and UV blocking coating 10 may be located on the same major surface or side of the glass substrate 1 (with the coating 10 being located over the coating 20, or vice versa).

In certain example embodiments, the diffusing coating 20 formulation may be based on the incorporation of inorganic pigments based on metal oxides into the high temperature curable glassy matrix such as frits. These inorganic pigments can be UV-blockers and/or IR-blockers, and/or colorants, which can with stand high temperatures after incorporation into the coating 20.

Discussed herein, for example, is also the dependence of the diffusing and optical performance (such as transmittance in visible region) of diffuser coatings 20 on the particle size of the inorganic pigments in coating 20. It is also noted that the particle size of the inorganic pigment(s) in the coating 20 also affects the thickness of the coating 20. Examples discussed below demonstrate that by reducing the particles size of the inorganic pigments in diffusing coating 20, the diffusing performance of the coating 20 (and thus of the diffuser D) can be improved with adequate transparency in the visible region (Tvis). Thus, the efficiency of the diffuser is also improved. A diffuser with a high diffusing property (e.g., F(Q)>0.100) can be made with high transmittance in the visible region (e.g., Tvis>57%).

Diffusers according to certain example embodiments (see FIG. 1) may be used in any suitable optical application, including but not limited to applications such as wrist watches, projection systems, display (e.g., liquid crystal display) backlights, computer screens, surgical equipment, optical communication systems, light sensors, fiber optic systems, microscope illumination systems, and light guides. In certain example embodiments, the diffuser may acts as a Lambertian or quasi-Lambertian diffuser.

Figure 2:
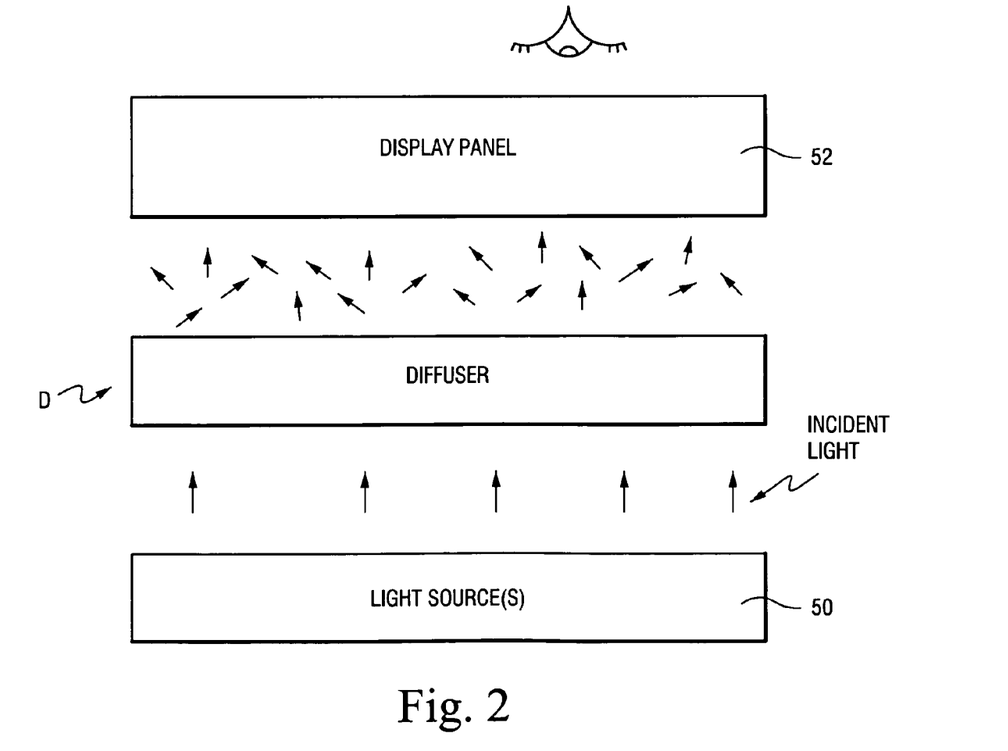
FIG. 2 is a cross sectional schematic diagram of any of the diffusers herein used in an example display application.

FIG. 2 illustrates an example embodiment, where any diffuser D discussed herein may be used in an illumination system of a display such as a liquid crystal display. The illumination system includes a light source(s) 50 for directing collimated or non-collimated light toward the diffuser D. The light from the source(s) 50 is considered incident light on the diffuser D. The light from the source(s) 50 includes both visible and UV radiation, and possibly IR radiation. The diffuser D (see any of FIGS. 1-3 and 5) scatters/spreads the visible light from the light source(s) 50 and optionally may cause a significant amount of the UV radiation from the source(s) 50 to be blocked. Thus, the light which makes its way from the diffuser D toward the display panel 52 is diffuse in nature and may have less UV radiation therein.

Figure 5:
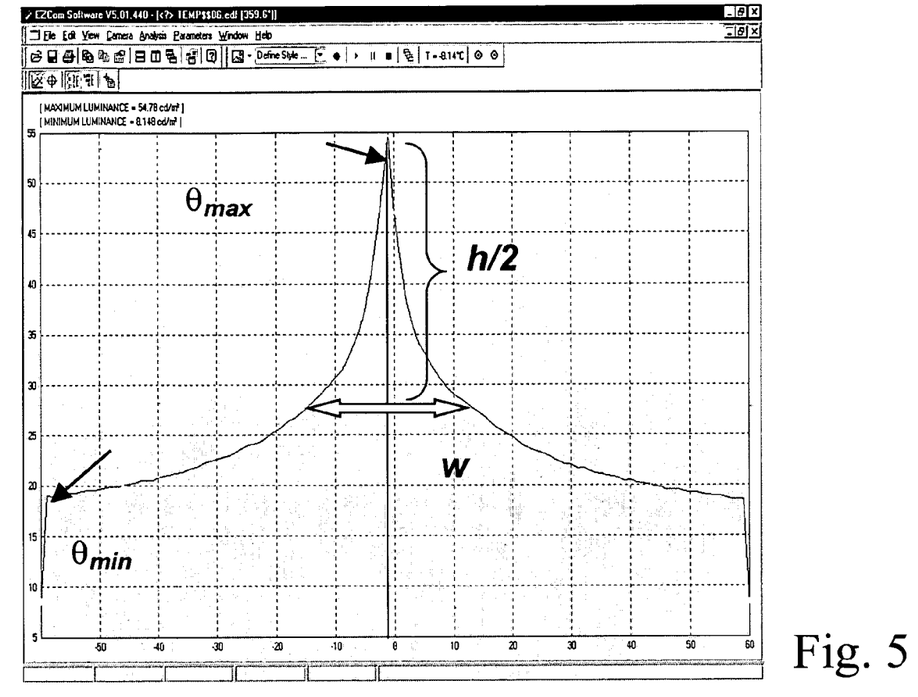
FIG. 5 is a symmetric Eldim plot of illumination vs. diffusing angle.

Lorentzian functions are useful in understanding diffusing characteristics, and the extend to which diffusion of light is satisfactory. FIG. 5 is an example symmetrical plot that extracts from an Eldim plot of illumination vs. diffusing angle. The shape of the specular peak in the incidence plane is similar to a mathematical function called a Lorentzian function. So, at least for the diffuser coatings of certain example embodiments of this invention, the distribution function of the symmetrical or substantially symmetrical plot in the incident plane may be referred to using a Lorentzian function. A Lorentzian function is characterized by a central peak with substantially symmetrical long tails. Hence, an Eldim plot which provides the substantially symmetrical plot is a representation of Lorentzian function F(Q) that can be defined by following two parameters (see FIG. 5) (note that:

Location parameter $\Delta\theta = \theta_{max} - \theta_{min}$

Scale parameter (W): Half Width Half Maximum (HWHM)

These two parameters further contribute to the Lorentzian function by equation (1)

$$F(Q) \frac{1}{4\left\{\frac{\theta\max - \theta\min}{W}\right\}^2 + 1} \rightarrow (1)$$

According to certain example embodiments, the particle sizes in the diffusing coating 20 are designed and/or provided, along with a thickness of the coating, so that the diffuser is capable of realizing a diffusing property F(Q) (see equation (1) above, where F(Q) is equal to the equation where one is in the numerator and the two parameters are in the denominator) of at least 0.100, more preferably at least 0.102, still more preferably at least 0.110, in certain example instances at least 0.125, in certain embodiments at least 0.200, and sometimes at least 0.250. These fairly high values of F(Q) are indicative of good diffusing properties of the diffuser.

It is also desirable in certain example instances to provide a diffuser that is capable of realizing both a high F(Q) value and a high visible transmission (Tvis). In certain example embodiments of this invention, the particle sizes in the diffusing coating 20 are designed and/or provided, along with a thickness of the coating, so that the diffuser is capable of realizing a visible transmission (Tvis) of at least 57%, more preferably at least 58%, even more preferably of at least 60%, and sometimes at least 61%.

In certain example embodiments, the diffusing coating 20 comprises inorganic pigments therein for light diffusing purposes, and the inorganic pigments are sized so as to permit a diffuser to realize a combination of high visible transmission and good diffusion qualities. In certain example embodiments, the diffusing coating 20 may be of or include a frit with the inorganic pigments therein. It has surprisingly been found that reducing the size of the pigment particles in the coating 20 improves both the diffusing and light transmission properties of the diffuser D. In certain example embodiments, the inorganic pigment particles in the diffuser are sized so as to have an average particle size (diameter) of no greater than 0.5 μm, more preferably no greater than 0.4 μm, and sometimes no greater than 0.08 μm. The Examples set forth below illustrate that the smaller particle sizes of the pigment particles in a frit based diffusing coating result in improved diffusing and light transmission properties of the diffuser.

In certain example embodiments, the pigment content of the diffusing coating 20 may be, by weight, from about 0.25-20%, more preferably from about 0.25-10%, and even more preferably from about 1-10%, and sometimes from about 1-6% For example and without limitation, the inorganic pigment(s) of the diffusing coating 20 may be of or include one or more of alumina, zinc oxide, cerium dioxide, titanium dioxide, silicon dioxide, and the like, and can be used as scattering centers for the diffuser. These pigment(s) may be provided in a frit or frit based material to make up coating 20 in certain example embodiments of this invention.

In certain example embodiments, the diffusing coating 20 is from about 0.5 to 10 μm thick, more preferably from about 1 to 7 μm thick, and most preferably from about 1 to 4 μm thick.

Optionally, different types of UV blocking/diffusing coating 10 may be used in the FIG. 1 embodiment (or other embodiments). Consider the following example types of example UV blocking coating 10 that may be used in conjunction with this embodiment, so as to function in both visible light diffusing and UV blocking manners. First, a coating of or including titania particles in a silane matrix in which D-50 is chemically incorporated may be used as coating 10. Second, a coating of or including zinc oxide particles in a D-50/polyurethanesil matrix may be used as coating 10. Third, a UV coating with no such particles therein may be subject to a fine mechanical imprinting so as to roughen the surface thereof whereby light diffusing and/or non-glare functionality can be achieved by such roughening. Fourth, a coating of or including silica and alumina in a glymo/D-50 matrix may be used as coating 10. In certain example embodiments, it is also possible to add fluorescent material(s) to the UV coating 10 of any of the embodiments discussed herein. These may be selected to absorb UV and re-emit visible light, thereby increasing efficiency of the illumination system.

In addition to the example UV blocking coatings 10 discussed above, other possible UV blocking coatings according to alternative example embodiments of this invention will now be discussed. Any of the below-discussed UV blocking coatings may be used for the UV blocking coating 10 in any embodiment.

UV blocking coating 10 may be, for purposes of example and without limitation, any suitable commercially available UV blocking coating such as a UV blocking coating available from Guardian Industries, Corp., Auburn Hills, Mich., or a silica based UV blocking coating available from Tru-Vue, Inc., Chicago, Ill. UV blocking coating 10 includes at least one layer, and blocks at least some UV radiation. For example and without limitation, any of the coatings described and/or illustrated in any of U.S. Pat. Nos. 5,332,618 or 5,371,138 (both incorporated herein by reference) may also be used as a UV blocking coating 10 in certain embodiments of this invention.

In certain example embodiments, UV blocking coating 10 prevents at least about 50% of UV radiation (300-380 nm) reaching the same from passing therethrough, more preferably at least about 70%, even more preferably prevents at least about 80% of UV radiation reaching the same from passing therethrough, and most preferably prevents at least about 90% (or at least about 95%) of UV radiation reaching the same from passing therethrough. In other words, UV blocking coating 10 preferably blocks at least about 50% of UV radiation (i.e., from 300-380 nm), more preferably at least about 70% of UV radiation, even more preferably at least about 80%, more preferably at least about 90% of UV radiation, and most preferably at least 95% of UV radiation (e.g., see FIGS. 7-12). UV blocking coating 10 may block UV radiation (from 300-380 nm) by, for example and without limitation, reflecting such UV radiation, absorbing such UV radiation, and/or converting amounts of such UV radiation into other type(s) of radiation (e.g., IR), and/or the like. It is noted that coating 10 is not limited to the precise coatings described above, as any suitable UV blocking coating may be used as coating 10 in different embodiments of this invention. UV blocking coatings 10 according to different embodiments may be formed in any suitable manner (e.g., via sputter coating, via vapor deposition, via capillary action, via roll(s) coating, and/or the like).

In certain example embodiments, the UV blocking coating 10 may be of or include a colloidal electro-conductive oxide solution having both infrared (IR) and ultraviolet (UV) blocking characteristics. In certain example embodiments of this invention, for UV blocking coating 10, a substantially transparent composite oxide coating is provided that includes a silica matrix, zinc antimonite, and a UV blocking material, thereby permitting the coating (e.g., applied via a coating sol) after application to block significant amounts of both IR and UV radiation. In certain example embodiments of this invention, a UV and IR blocking coating comprises each of cerium oxide and zinc antimonite in the form of nanoparticulate, and silicon oxide (e.g., $SiO_2$). It has surprisingly been found that such coatings are effective at blocking both UV and IR radiation, and also are resistant to high temperatures as spectral response remains substantially unchanged in certain example instances after one or two hours of substantial heating (e.g., to about 400 or 450 degrees C.). In certain example embodiments, the coated article has transmission for a wavelength of 2300 nm, of less than 10%. In certain example embodiments, the sol type coating comprises from about 15 to 50% cerium oxide (more preferably from about 20 to 45%, and most preferably from about 30 to 40%), from about 30 to 70% zinc antimonate (more preferably from about 35 to 65%, and most preferably from about 40 to 55%), and from about 5 to 35% silicon oxide (more preferably from about 10 to 30%, and most preferably from about 12 to 25%). It has been found that these amounts of such materials in the sol type coating provide a coating that is effective at blocking both UV and IR radiation, and is also are resistant to high temperatures. In the case where the colloidal antimony oxide is antimony oxide sol, the method of producing electroconductive anhydrous zinc antimonate inclusive coatings according to certain example embodiments can be produced by, inter alia, mixing antimony oxide sol and a zinc compound, and then calcining the mixture at 300 to 680 degrees C after drying. The zinc compound which can be used in certain example embodiments is at least one zinc compound selected from the group consisting of zinc hydroxide, zinc oxide, inorganic acid salts of zinc and organic salts of zinc. The inorganic acid salts of zinc include zinc carbonate, basic zinc carbonate, zinc nitrate, zinc chloride, zinc sulfate and the like. The organic acid salts of zinc include zinc formate, zinc acetate, zinc oxalate and the like. These zinc compounds may be those put on the market as industrial chemicals. When zinc hydroxide and zinc oxide are used, it is preferred that they have a primary particle diameter of 100 nm or less. In particular, the salts containing acids that vaporize upon calcination, for example, carbonate salts and organic acid salts, are preferred. They may be used alone or as admixtures of two or more of them. The colloidal antimony oxide which can be used is antimony oxide having a primary particle diameter of 100 nm or less and includes diantimony pentoxide sol, hexaantimony tridecaoxide sol, diantimony tetroxide hydrate sol, colloidal diantimony trioxide and the like. The diantimony pentoxide sol can be produced by known methods, for example, a method in which diantimony trioxide is oxidized, a method in which an alkali antimonate is dealkalized with ion exchange resin, a method in which sodium antimonate is treated with an acid, and/or the like. The hexaantimony tridecaoxide sol can be produced by a method in which diantimony trioxide is oxidized and the diantimony tetroxide hydrate sol can also be produced by a method in which diantimony trioxide is oxidized. The colloidal diantimony trioxide can be produced by a gas phase method in certain example instances.

In still further example embodiments, the UV coating 10 may be of or include any coating mentioned in U.S. Pat. No. 6,649,212, the disclosure of which is hereby incorporated herein by reference. For example, the UV blocking coating may comprise a UV-radiation absorbing compound, comprising: alternating repeat units of: (1) a first monomer derived from a compound having the general formula: $(CH_2OCHCH_2)-R_z-[(R_a(OR)_b-Si-O-Si-R_a(OR)_b)]_c-R_z-(CH_2OCHCH_2)$ wherein $(CH_2OCHCH_2)$ is an epoxy group, $R_z$ is an organic group bonded to a siloxane silicon atom and epoxy groups, $R_a$ is an organic group bonded to a silicon atom and comprises from one to six carbon atoms, $(OR)_b$ is an alkoxy-group wherein R is an organic radical having from one to six carbon atoms, a and b are each at least one, a+b are equal to 3, and c represents the number of Si—O—Si repeat units and is at least 1, and (2) a second monomer derived from an UV-absorbing aromatic compound having at least two aromatic hydroxyl groups reactive with epoxy groups on said first monomer. In certain example instances, the second monomer may be a di-, tri-, or tetrafunctional hydroxybenzophenone. In certain example instances, the second monomer may be 2,2'dihydroxybenzophenone or 2,2'-4, 4'tetrahydroxybenzophenone.

In still further example embodiments, the UV blocking coating 10 may be of any type discussed in U.S. Ser. No. 10/922,235, the disclosure of which is hereby incorporated herein by reference. For instance, there may be provided a UV blocking coating that allows for relatively lower temperature cross-linkage reactions between a UV-absorbent compound and an epoxy alkoxysilane. More specifically, UV-absorbent coatings on transparent substrates are formed by prepolymerizing a mixture consisting essentially of a hydroxy-benzophenone, an epoxyalkoxysilane and an organic catalyst at an elevated temperature of between about 40° C. to about 130° C. and for a time sufficient such that between about 30 to about 70% of the epoxyalkoxysilane moieties form ring-opened oligomers and polymers with degrees of polymerization of between about 2 to about 2000, and more preferably between about 2 to 200. Such prepolymerized mixture may then be coated onto the surface of a transparent substrate. Most preferably, the prepolymerized mixture is hydrolyzed prior to being coated onto the substrate in an alcoholic acidic solution. For example, as a UV-absorbent compound there is tetrahydroxybenzophenone. An example epoxyalkoxysilane is 3-glycidoxypropyl trimethoxysilane (sometimes hereinafter referenced more simply as "glymo"). It may be possible that prepolymerization be effected in the presence of a tertiary amine such as triethylamine (TEA) as the organic catalyst which is only one of many possible amine catalysts that one practiced in the art will recognize. In addition, it is also possible to use a basic alkoxide, ROM where M is an alkali metal or alkaline earth metal and RO is any suitable, soluble organic that will react with the glymo epoxy ring or with the $RSi(OR)_3$ group. Likewise, it is possible to use species such as $R_4NOH$ and $R_4POH$ as catalysts for the ring-opening oligomerization or polymerization of the epoxy group on glymo.

In other example embodiments, the UV blocking coating 10 may be of or include a resin composition including a blend of silanols, colloidal silica, an ultraviolet-absorbing material, and optionally a dye. The silanol(s) may include a silanol from the group having the formula $R_wSi(OH)_x$ or $R_ySi(OR')_z$ where (w+x) or (y+z)=4, and R and R' may be organic radicals possibly without any crosslinking sites, silanol from the group having the formula $R"Si(OR''')_3$ where R" is a hydrogen atom or an organic radical and R''' is an organic radical containing a crosslinking site. The UV absorbing material may be, for example, benzophenone, a benzotriazole, and/or a benzothiazole. A process of forming the resin composition for the UV coating may include reacting the silanols and the UV absorbing material under agitation for many hours. Further example details as to such UV coatings may be found in U.S. Pat. No. 5,371,138, the disclosure of which is incorporated herein by reference.

It will be appreciated that in certain example embodiments, the diffuser D (or the UV blocking coating 10) has a $T_{uv}$ (UV transmission) (i.e., from 300-380 nm) of no more than about 50%, more preferably no more than about 30%, even more preferably no more than about 20%, still more preferably no more than about 10%, even more preferably no more than about 5% (or 2%), and most preferably no more than about 1%. In certain example embodiments of this invention, the diffuser D has an IR transmission of no more than about 50%, more preferably no more than about 45%.

EXAMPLES 1-10

Figure 3:
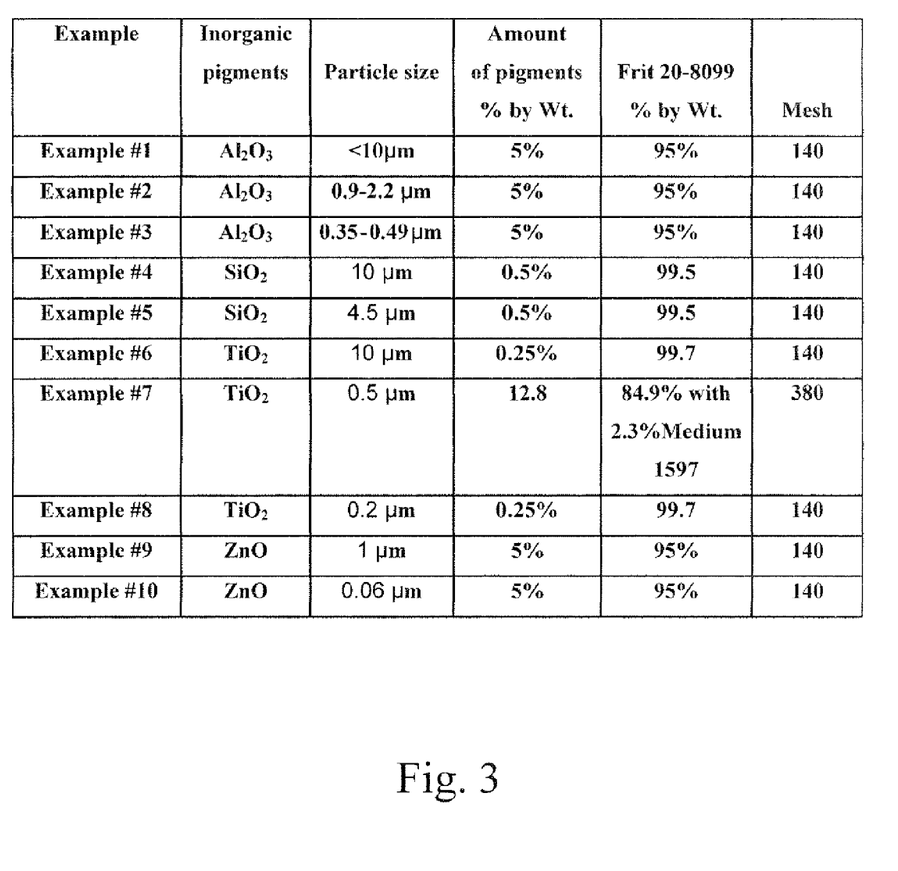
FIG. 3 is a table illustrating characteristics of Examples 1-10 according to different embodiments.
Figure 4:
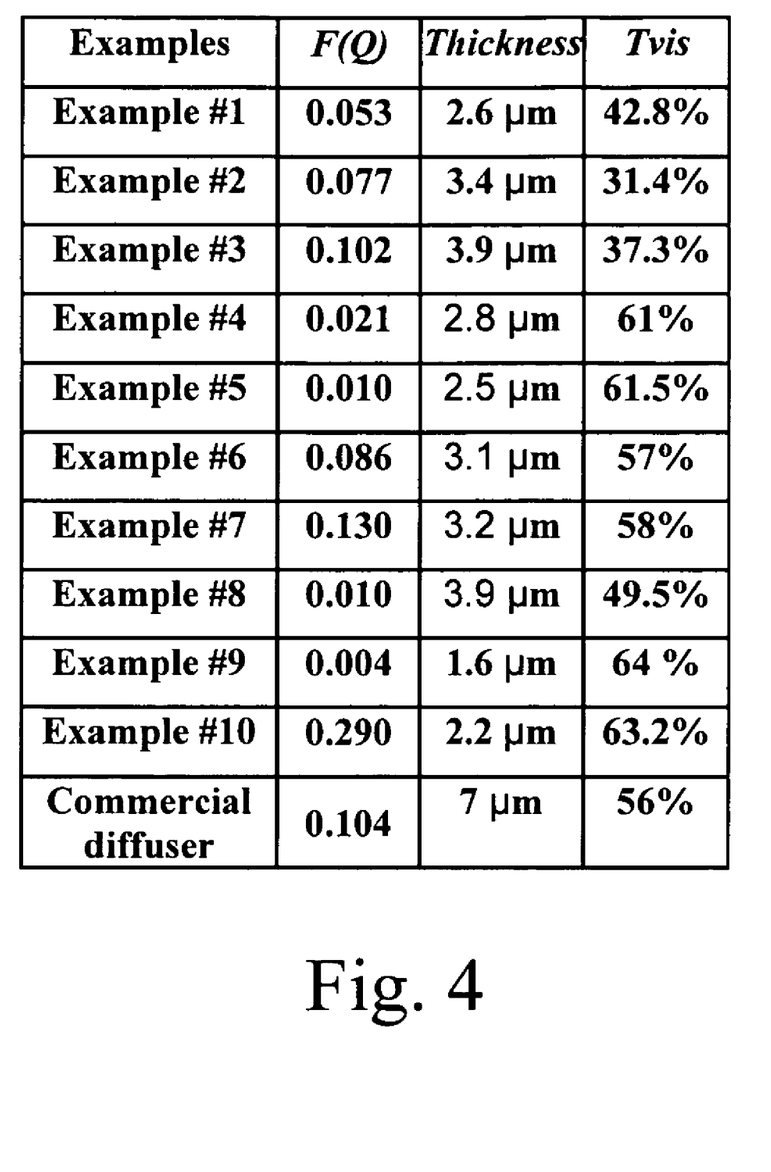
FIG. 4 is a table illustrating optical characteristics of the diffusers of Examples 1-10.

Examples 1-10, are for purposes of example only and without limitation. In each of Examples 1-10, a diffusing coating 20 was formed directly on a glass substrate 1 (note that herein, the word "on" is not limited to directly on, but also includes indirectly on with other things in between). FIG. 3 illustrates the materials used for the diffusing coatings 20 for each of the Examples, whereas FIG. 4 illustrates the diffusing and light transmission properties for each of the Examples.

Figure 6A:
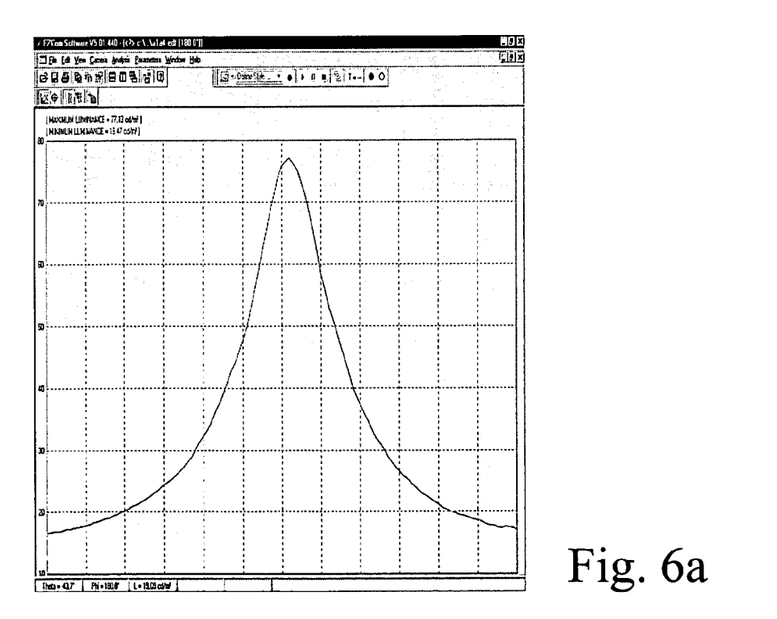
FIG. 6 illustrates three illumination vs. diffusing angle plots showing the results of Examples 1-3.
Figure 6B:
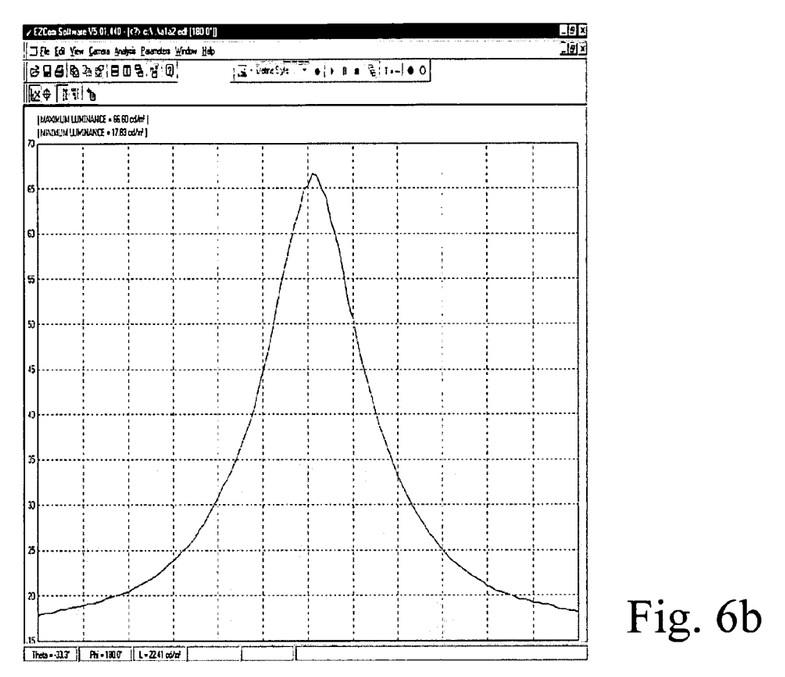
Figure 6C:
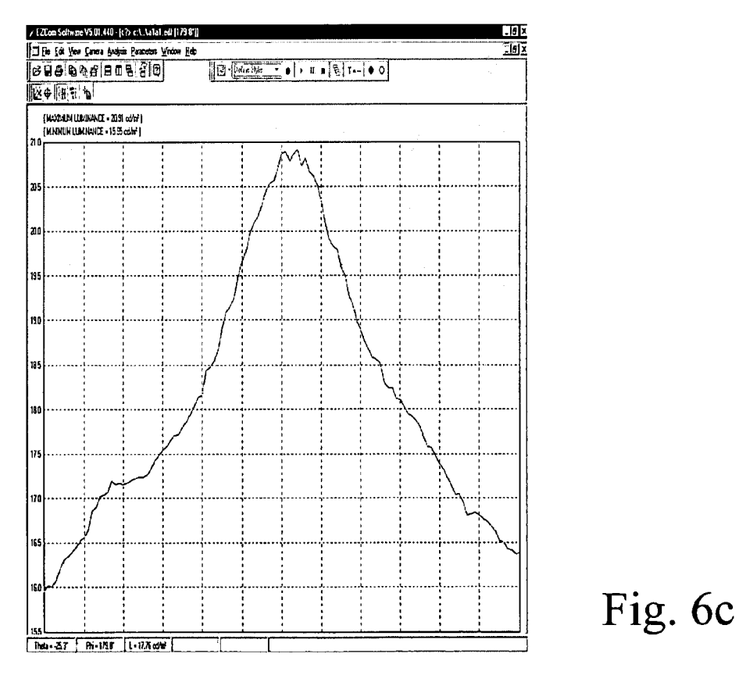
Figure 7A:
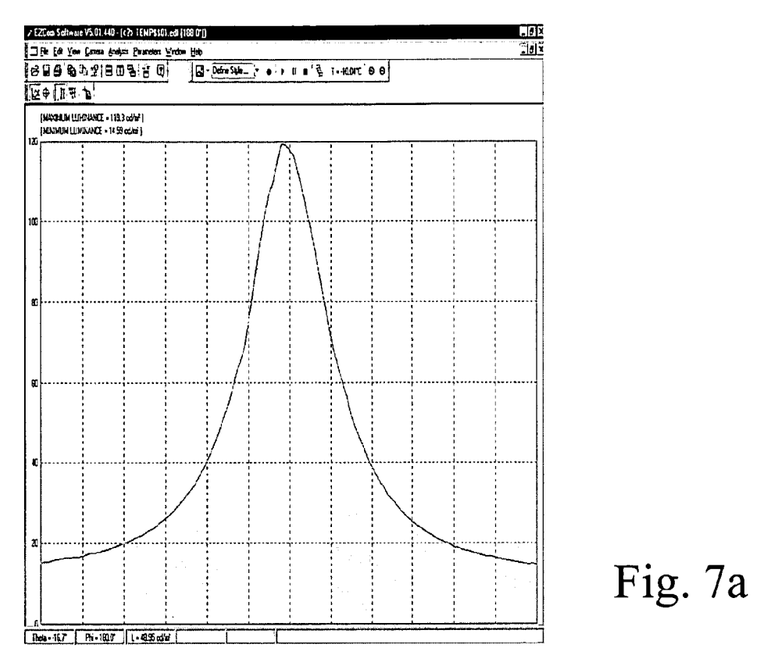
FIG. 7 illustrates two illumination vs. diffusing angle plots showing the results of Examples 4-5.
Figure 7B:
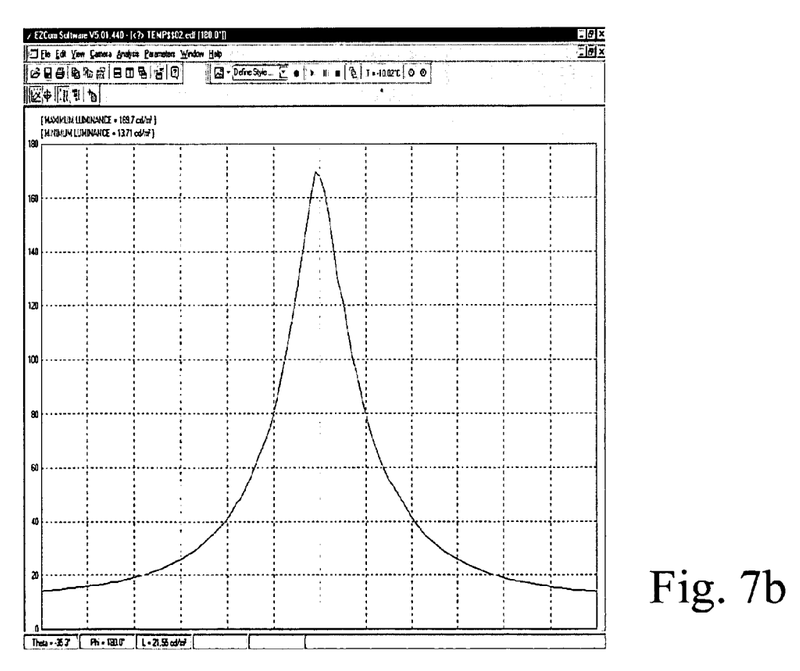
Figure 8A:
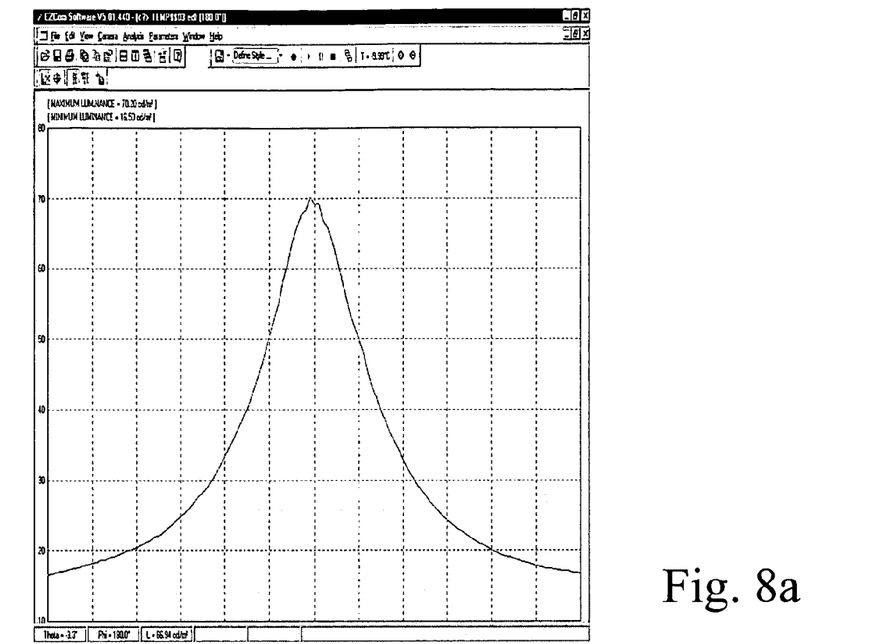
FIG. 8 illustrates three illumination vs. diffusing angle plots showing the results of Examples 6-8.
Figure 8B:
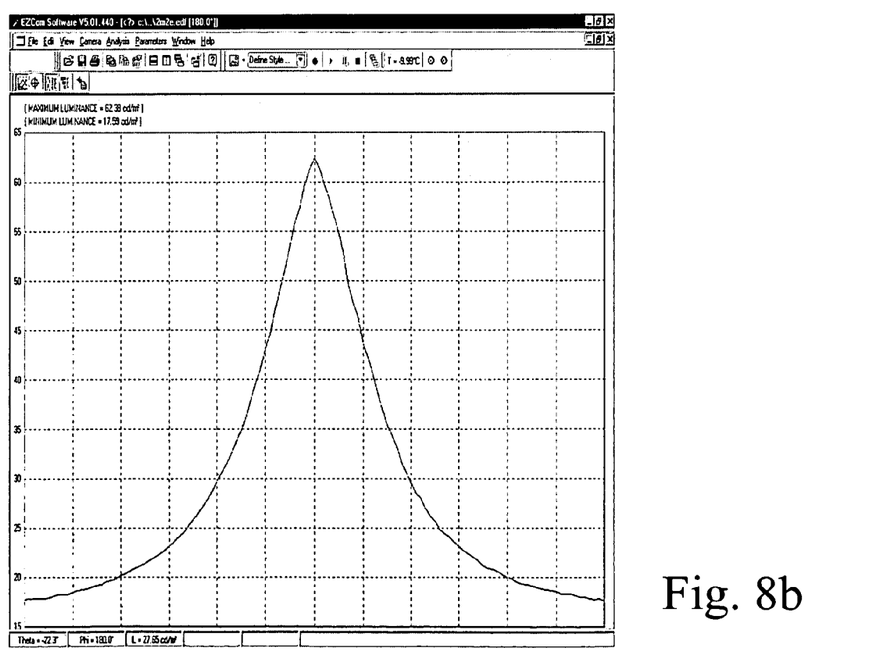
Figure 8C:
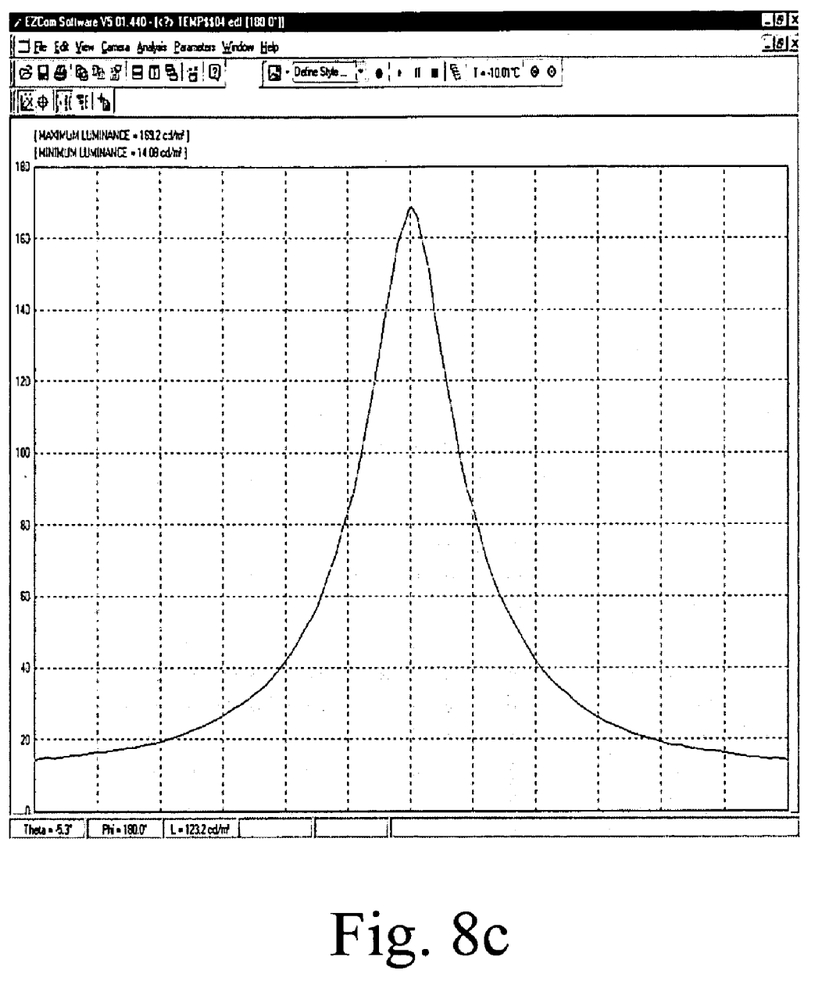

Examples 1-3 used an inorganic light diffusing pigment of alumina ($Al_2O_3$) in a frit material as the diffusing coating 20 on the glass substrate 1. The frit used in these examples was Ferro frit 20-8099 (this is a low melting glass frit) obtained from Ferro Corporation, located in Ohio. In each of Examples 1-3, the alumina pigment made up about 5% by weight of the diffusing coating 20, with the other 95% being made up of the frit material. A mesh size of 140 was used in application. It will be appreciated from FIG. 3 that the particle size of the alumina pigment was progressively reduced from Example 1 to Example 3, with the particle size of 0.35 to 0.49 μm in Example 3 being the smallest. Surprisingly, it was found that this smallest particle size in Example 3 resulted in the best combination of diffusing property F(Q) and visible transmission (Tvis) (see FIGS. 3-4). The small particle size used in Example 3 resulted in a much improved F(Q) compared to Examples 1-2, and the visible transmission was also satisfactory considering that alumina was the pigment. Thus, it can be see that the smaller particle sizes resulted in unexpectedly improved results. Note that FIG. 6 illustrates illumination vs. diffusing angle plots showing the results of Examples 1-3, with (a) in FIG. 6 representing Example 1, (b) in FIG. 6 representing Example 2, and (c) in FIG. 6 representing Example 3. It will be appreciated from Equation (1) above that to realized a higher and more desirable F(Q), larger values for "w" are desired. FIG. 6 illustrates that Example 3 had a higher "w" value than did Examples 1-2, and thus a higher and improved F(Q) value.

Figure 9A:
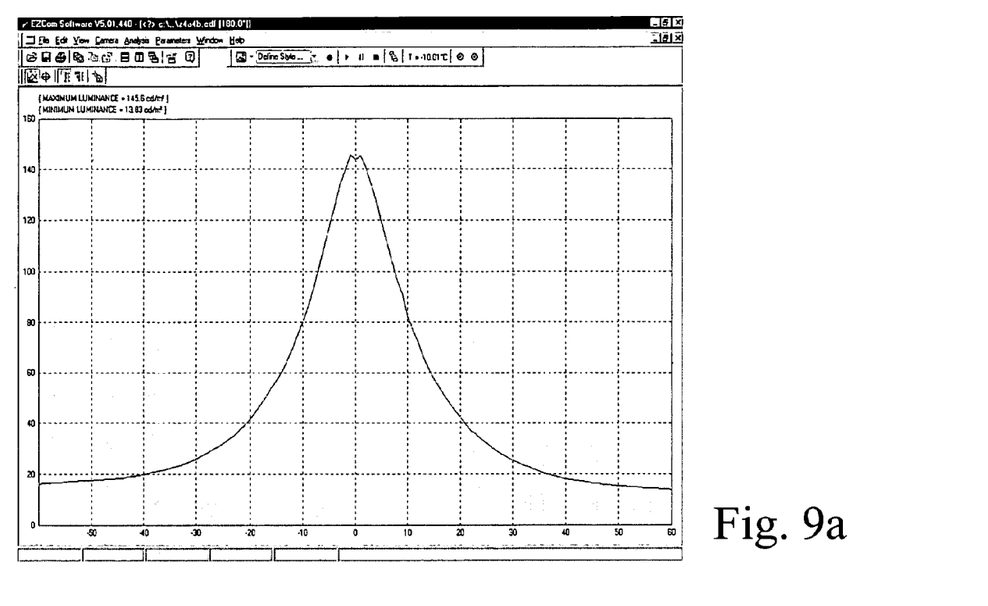
FIG. 9 illustrates two illumination vs. diffusing angle plots showing the results of Examples 9-10.
Figure 9B:
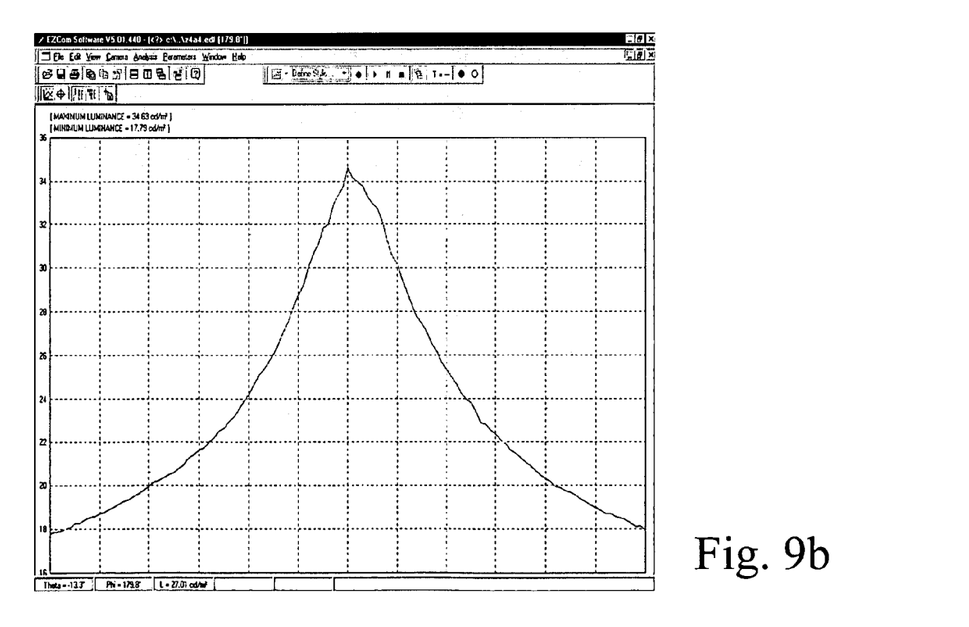

Examples 9-10 used an inorganic light diffusing pigment of zinc oxide in a frit material as the diffusing coating 20 on the glass substrate 1. The frit used in these examples was Ferro frit 20-8099 obtained from Ferro Corporation, located in Ohio. It will be appreciated from FIG. 3 that the particle size of the zinc oxide pigment was progressively reduced from Example 9 to Example 10, with the average particle size of 0.06 μm in Example 10 being the smallest. Surprisingly, it was found that this smallest particle size in Example 10 resulted in the best combination of diffusing property F(Q) and visible transmission (Tvis) (see FIGS. 3-4). The small particle size used in Example 10 resulted in a much improved F(Q) compared to Example 9, and the visible transmission was also satisfactory. Note that FIG. 9 illustrates illumination vs. diffusing angle plots showing the results of Examples 9-10, with (a) in FIG. 9 representing Example 9, and (b) in FIG. 9 representing Example 10. It will be appreciated from Equation (1) above that to realized a higher and more desirable F(Q), larger values for "w" are desired. FIG. 9 illustrates that Example 10 had a higher "w" value than did Example 9, and thus a higher and improved F(Q) value.

Example 7 realized a better factor F(Q) than did the other Examples using titania as a pigment particle. This may be the result of using the frit in combination with 2.3% of the Medium 1597 from Ferro. The high pigment content (12.8%) of Example 7 (compared to Examples 6 and 8) also shows that a larger pigment content may help increase F(Q).

While the technology presented herein has been described in connection with what is presently considered to be the most practical and preferred embodiment, it is to be understood that the technology is not to be limited to the disclosed embodiment, but on the contrary, is intended to cover various modifications and equivalent arrangements included within the spirit and scope of the appended claims.

The invention claimed is:

1. An illumination system comprising:
a light source for emitting light, the light emitted from the light source including at least visible light and ultraviolet (UV) radiation;
a diffuser positioned so as to receive light from the light source, the diffuser diffusing visible light received from the light source towards another element of the illumination system;
wherein the diffuser comprises a glass substrate, with a light diffusing coating formed on an external surface of said glass substrate, the light diffusing coating comprising inorganic pigment particles mixed with frit; and
wherein the diffuser has a diffusing property F(Q) of greater than 0.100 and a visible transmission of at least 57%, where F(Q) is defined by:

$$F(Q) = 1/[4(\{\theta max - \theta min\}/W)^2 + 1]$$

wherein W is a half width at a half maximum value point of a illumination vs. diffusing angle plot, θmax is a maximum value of the illumination vs. diffusing angle plot, and θmin is a minimum of at least one of the tails of the illumination vs. diffusing angle plot, wherein
the average particle size of the inorganic pigment particles is no greater than 0.5 microns, and the thickness of the diffusing coating is from about 1.0 to 7.0 microns.

2. The illumination system of claim 1, wherein the diffuser has a diffusing property F(Q) of greater than 0.102.

3. The illumination system of claim 1, wherein the diffuser has a diffusing property F(Q) of greater than 0.110.

4. The illumination system of claim 1, wherein the diffuser has a diffusing property F(Q) of greater than 0.125.

5. The illumination system of claim 1, wherein the diffuser has a diffusing property F(Q) of greater than 0.200.

6. The illumination system of claim 1, wherein the diffuser has a visible transmission of at least about 58%.

7. The illumination system of claim 1, wherein the diffuser has a visible transmission of at least about 60%.

8. The illumination system of claim 1, wherein the diffusing coating comprises from about 0.25-20%, by weight, of the inorganic pigment particles.

9. The illumination system of claim 1, wherein the inorganic pigment particles comprise one or more of cerium dioxide, titanium dioxide, zinc oxide, and titanium dioxide.

10. The illumination system of claim 1, wherein the diffusing coating comprises at least about 80% of the flit by weight.

11. The illumination system of claim 1, wherein the diffuser further comprises a UV blocking coating so that the diffuser has a $T_{UV}$ (UV transmission) of no greater than about 5%, more preferably no greater than about 2%.

12. The illumination system of claim 1, wherein the diffusing coating is in direct contact with the glass substrate.

13. The illumination system of claim 1, wherein the diffusing coating comprises at least about 90% of the frit by weight.

14. An illumination system comprising:
a light source for emitting light;
a diffuser positioned so as to receive light from the light source, the diffuser diffusing visible light received from the light source towards another element of the illumination system; and
wherein the diffuser comprises a glass substrate, with a light diffusing coating formed on an external surface of said glass substrate, the light diffusing coating comprising inorganic pigment particles mixed with glass frit; and
wherein the diffuser has a diffusing property F(Q) of greater than 0.100 and a visible transmission of at least 57%, where F(Q) is defined by:

$$F(Q) = 1/[4(\{\theta max - \theta min\}/W)^2 + 1]$$

wherein W is a half width at a half maximum value point of a illumination vs. diffusing angle plot, θmax is a maximum value of the illumination vs. diffusing angle plot, and θmin is a minimum of at least one of the tails of the illumination vs. diffusing angle plot, wherein
the average particle size of the inorganic pigment particles is no greater than 0.5 microns, and the thickness of the diffusing coating is from about 1.0 to 7.0 microns.

15. The illumination system of claim 14, wherein the diffuser has a diffusing property F(Q) of greater than 0.102.

16. The illumination system of claim 14, wherein the diffuser has a diffusing property F(Q) of greater than 0.125.

17. The illumination system of claim 14, wherein the diffuser has a visible transmission of at least about 58%.

18. The illumination system of claim 14, wherein the diffusing coating comprises from about 0.25-20%, by weight, of the inorganic pigment particles.

19. The illumination system of claim 14, wherein the inorganic pigment particles comprise one or more of cerium dioxide, titanium dioxide, zinc oxide, and titanium dioxide.

20. The illumination system of claim 14, wherein the diffusing coating comprises at least about 80% of the frit by weight.

21. The illumination system of claim 14, wherein the diffusing coating is in direct contact with the glass substrate.

22. The illumination system of claim 14, wherein the diffusing coating comprises at least about 90% of the frit by weight.

* * * * *